United States Patent
Rao et al.

[11] Patent Number: 5,695,199
[45] Date of Patent: Dec. 9, 1997

[54] PISTON SEALING ASSEMBLY

[76] Inventors: V. Durga Nageswar Rao, 5255 Clarendon Crest, Bloomfield Township, Mich. 48302; Daniel Michael Kabat, 4190 Locust Valley La., Oxford, Mich. 48370; Daniel Joseph German, 27120 West, Flat Rock, Mich. 48134

[21] Appl. No.: 213,335

[22] Filed: Mar. 14, 1994

[51] Int. Cl.$^6$ .................... F16J 9/20; F16J 9/22
[52] U.S. Cl. .................... 277/165; 277/169; 277/174; 277/176; 277/216
[58] Field of Search ................. 277/165, 168, 277/169, 174, 176, 216; 29/888.049, 888.07, 888.076

[56] References Cited

U.S. PATENT DOCUMENTS

| | | | |
|---|---|---|---|
| 1,532,937 | 4/1925 | Peeler | 277/169 |
| 1,901,199 | 3/1933 | Stine | 277/169 |
| 3,727,927 | 4/1973 | Packard | 277/216 |
| 3,751,047 | 8/1973 | McGee | 277/216 |
| 3,806,139 | 4/1974 | Suzuki et al. | 277/235 A |
| 3,907,310 | 9/1975 | Dufour | 277/92 |
| 4,123,072 | 10/1978 | Sharpe | 277/216 |
| 4,289,264 | 9/1981 | Rawlins | 277/27 |
| 4,304,415 | 12/1981 | Wolf et al. | 277/205 |
| 4,350,352 | 9/1982 | Kolarik | 277/216 |
| 4,438,937 | 3/1984 | Moriarty | 277/215 |
| 4,846,051 | 7/1989 | Wade et al. | 92/127 |
| 4,890,849 | 1/1990 | Eason | 277/27 |
| 5,050,892 | 9/1991 | Kawai et al. | 277/168 |
| 5,169,159 | 12/1992 | Pope et al. | 277/27 |
| 5,275,422 | 1/1994 | Rehfeld | 277/216 |

FOREIGN PATENT DOCUMENTS 2117868  10/1983  United Kingdom ............ 277/176

Primary Examiner—William A. Cuchlinski, Jr.
Assistant Examiner—John L. Beres

[57] ABSTRACT

A sealing assembly that significantly reduces or eliminates blow-by, peristolic pumping and sealing element flutter while, at the same time, reducing to ultra low levels friction between the sealing element and its assembly. The assembly has surfaces in at least one of the bore wall or piston to form a groove facing the other of the wall or piston, the groove having exposed smoothly curved shoulders which face each other. A sealing element is positioned in the groove, the element having smoothly curved side surfaces mateable with the groove shoulders for supporting the element in the groove. The sealing element has an exposed outer surface (crown) which also is smoothly curved with a pair of mirror image shoulders. The crown is effective to tangentially contact the cylinder wall while the element side surfaces each tangentially contact their respective mating groove shoulders. The pair of mating groove shoulders and element side walls each have defined curvatures which are effective to maintain the tangency and transfer any load from the sealing element (resulting from contact between the element crown and the cylinder wall contact) to the groove shoulders in a substantially equal manner regardless of articulation of the element in the groove. The curvature of the groove shoulders side surfaces and crown surfaces all adhere to a tractrix relationship.

13 Claims, 4 Drawing Sheets

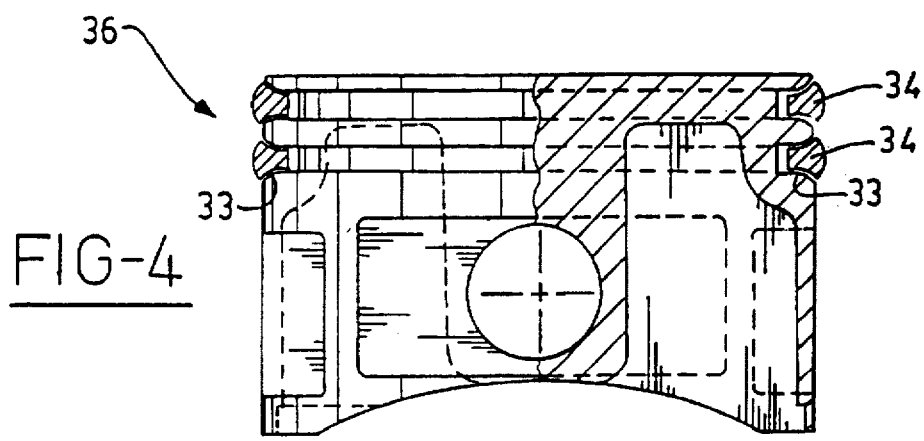
FIG-4
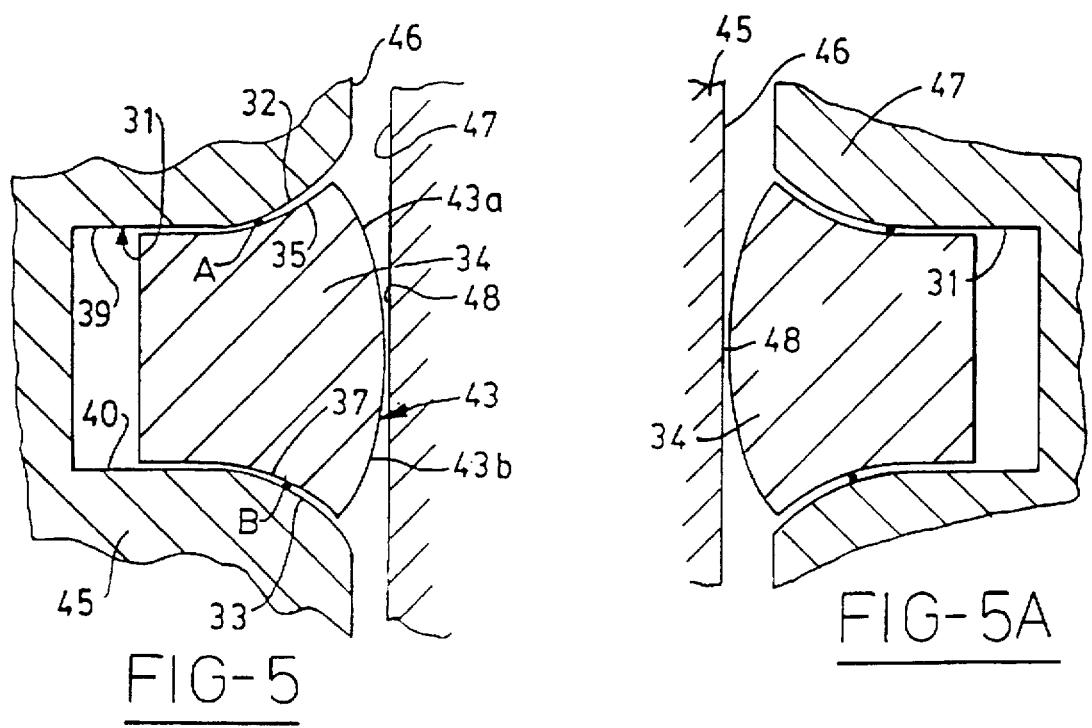
FIG-5
FIG-5A
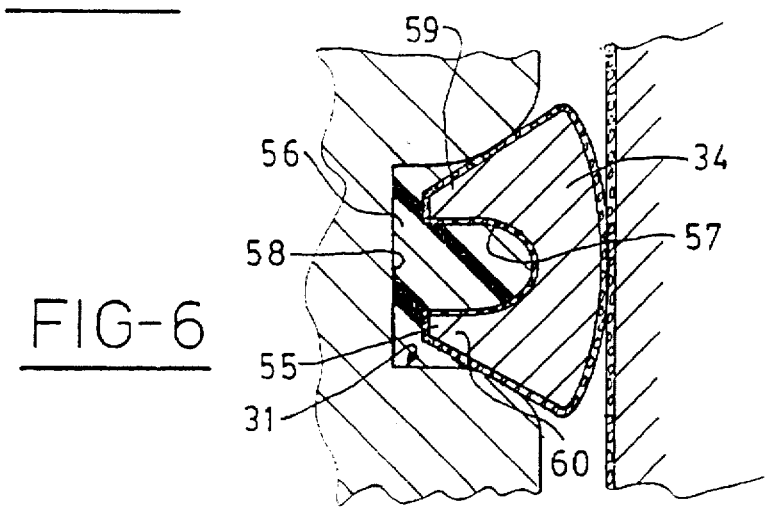
FIG-6

PISTON SEALING ASSEMBLY

BACKGROUND OF THE INVENTION

1. Technical Field

This invention relates to the technology of sealing relatively moveable surfaces and more particularly to piston sealing assemblies that can substantially reduce friction, blow-by and peristolic pumping.

2. Discussion of the Prior Art

Internal combustion engines have piston rings which are usually made of flat heat-resistant metal (split to allow for assembly and to exert a radial resiliency) sized to fit within straight sided grooves that allow for upward and downward shifting of the rings within their grooves. High pressure combustion gases at one side of the rings tend to force the ring against the opposite side of the groove, producing high frictional contact that prevents the ring from adjusting radially to maintain good sealing contact. Gases will migrate behind the ring and leak as the ring changes position between strokes or the gases will migrate past the outer periphery of the rings and leak as the rings fail to maintain annular contact (both effects are often referred to as blow-by). More accurately, blow-by is the charge mass in the combustion chamber that leaks past the piston rings and accounts for about 4% of the brake specific fuel consumption (BSFC); friction is the useful energy expanded to overcome the friction between the piston/piston rings and the cylinder bore used is usually around 12% BSFC.

The upward and downward shifting of the rings within their grooves allows liquid lubricants, such as oil splashed on the lower portion of the cylinder bore wall, to be unwantedly pumped upward into the combustion chamber as the oil gets trapped between the rings and released on a change of stroke. This is sometimes referred to as unintended peristolic pumping. In more severe cases, the shifting of the ring within the groove may involve twisting or inversion of its radial plane about it axis, sometimes referred to as flutter. This flutter can eventually wear away the sharp corners of the groove allowing even more exaggerated flutter, blow-by and peristolic pumping.

Attempts by the prior art to reduce or eliminate blow-by have included the use of relieved ring side surfaces and crown to balance the gas pressures and reduce friction; unfortunately, such constructions cannot significantly reduce or eliminate blow-by or peristolic pumping although flutter can be reduced somewhat (see U.S. Pat. No. 4,289, 264). In 1989, an ultra-thin gap was used between the piston and bore wall to eliminate need for any piston ring and allow rolling gas cylinders to act as sealing rings which significantly reduced blow-by and peristolic pumping (see U.S. Pat. No. 4,846,051). However, this solution required an uncooled, oilless engine environment.

SUMMARY OF THE INVENTION

It is an object of this invention to provide a new sealing assembly that significantly reduces or eliminates blow-by, peristolic pumping and sealing element flutter while at the same time reducing to ultra low levels friction between the sealing element and its assembly.

In its broadest aspect, the apparatus of this invention meets the above object by defining surfaces in at least one of the bore wall or piston to form a groove facing the other of the wall or piston, the groove having exposed smoothly curved shoulders which face each other. A sealing element is positioned in the groove, the element having smoothly curved side surfaces mateable with the groove shoulders for supporting the element in the groove. The sealing element has an exposed outer surface (crown) which also is smoothly curved with a pair of mirror image shoulders. The crown is effective to tangentially contact the cylinder wall while the element side surfaces each tangentially contact their respective mating groove shoulders. The pair of mating groove shoulders and element side walls each have defined curvatures which are effective to maintain the tangency and transfer any load from the sealing element (resulting from contact between the element crown and the cylinder wall contact) to the groove shoulders in a substantially equal manner regardless of some tilting of the element with respect to the groove. The curvature of the groove shoulders, side surfaces and crown surfaces all adhere to a tractrix relationship whereby the tangential contact is free to shift along the defined curvature as the element changes orientation.

The effectiveness of the sealing assembly can be further enhanced by coating the mating surfaces with a thin film of solid lubricant and assuring that the gap between the sealing element and cylinder wall is regularly limited to about 0.0002 inches or less so that the mixture of charge or combustion gases can act as a squeeze film lubrication therebetween.

The sealing assembly can eliminate thermally caused gap disparities between the piston and cylinder bore wall to ensure high performance of the seal construction by using one or more of the following: (a) use of an elastomer ring acting between the root of the groove and the sealing element to bias the element lightly against the cylinder bore wall in spite of thermal divergences; (b) the sealing element may be hollowed out to provide slightly flexible side legs (the legs carry the side surfaces of the element) so that the sealing element can more readily maintain tangential contact of the shoulders and side walls while experiencing thermal growth divergences; (c) continuous oil cooling of the internal surfaces of the piston to extract heat and restrict thermal growth divergences; and (d) deploy essentially the same metal in both the piston ring and cylinder bore wall to better respond to thermal changes.

BRIEF DESCRIPTION OF THE DRAWINGS

FIG. 4 is a central sectional view of a piston assembly incorporating the principles of this invention;

FIG. 5 is a highly enlarged portion of FIG. 4;

FIG. 5A is a view like FIG. 5, but showing a groove defined in the bore wall to receive the sealing element FIG. 6 is a view like FIG. 5, but of an alternative embodiment;

DETAILED DESCRIPTION AND BEST MODE

Figure 1:
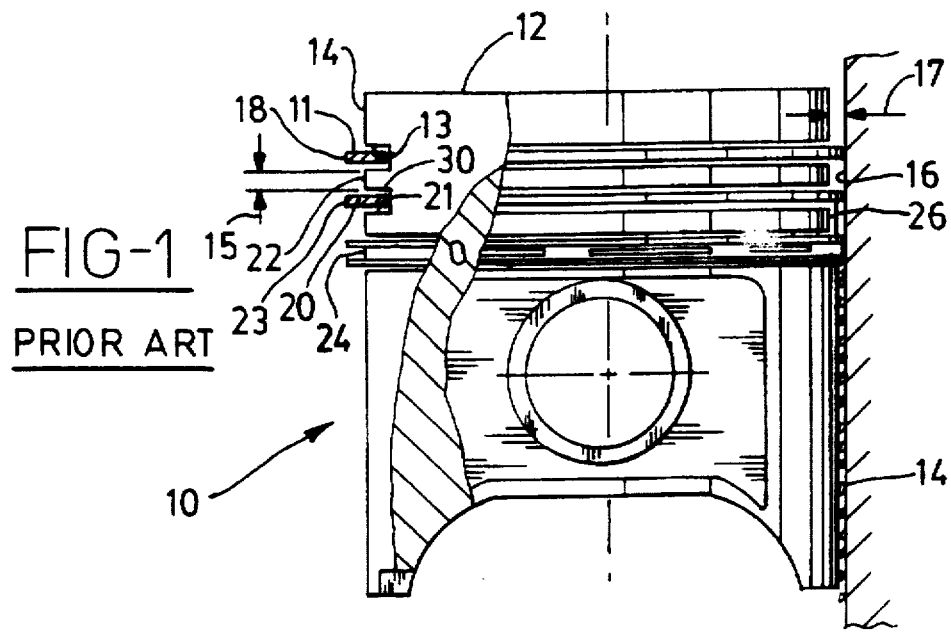
FIG. 1 is a central sectional view of a typical commercial prior art piston construction illustrating the entire piston ring assembly.
Figure 2:
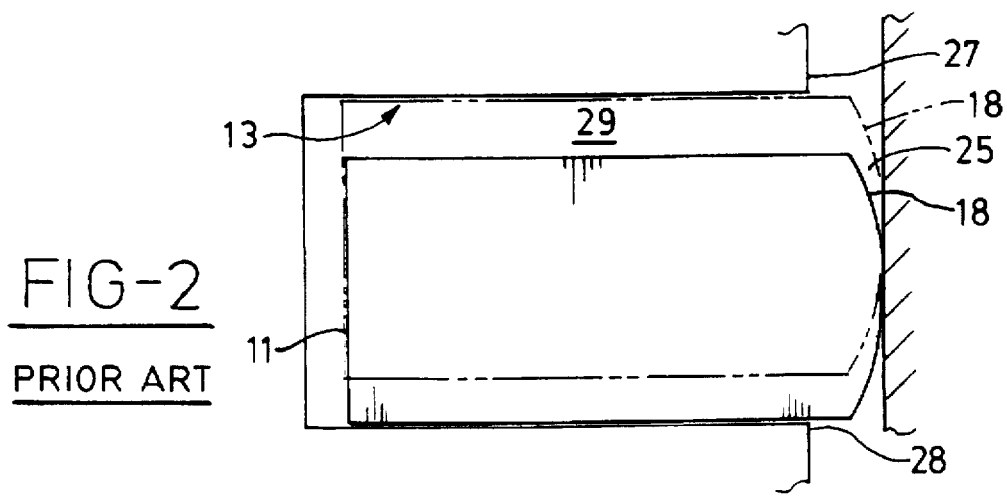
FIG. 2 is a highly enlarged portion of FIG. 1 illustrating the top ring in the compression stroke position.
Figure 3:
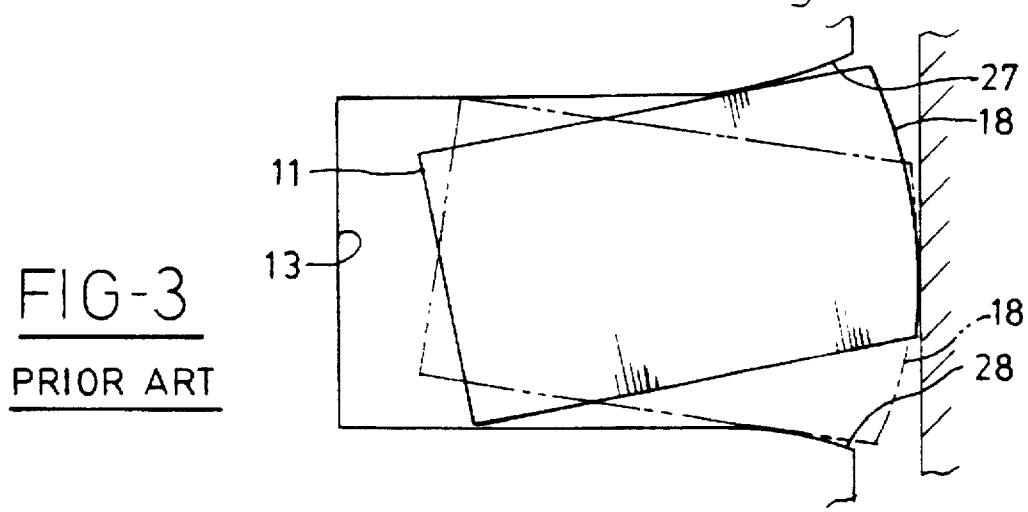
FIG. 3 is a view like FIG. 2 but illustrating the effects of ring flutter during up and down strokes.

In order to understand the improvement of this invention, it is necessary to explain how a conventional three-ring piston design 10 functions (see FIGS. 1-3). The upper ring 11 (commonly called the top compression ring) is located approximately 5-6 millimeters below the piston crown 12 within a groove 13; the piston surface from the crown 12 to the top groove 13 is generally known as the top land 14. The axial clearance between the groove 13 and the ring 11 is around 40-50 microns (0.002 inches). The clearance 17 between the top land 14 and the cylinder bore wall 16 is designed to prevent interference during cold starts or other conditions that induce rapid expansion of the piston crown ahead of the cylinder bore. The ring face 18 (the surface riding on the cylinder bore surface 16 and oil film 19) is of a barrel profile to promote rapid hydrodynamic film formation and easy glide during both upward as well as downward piston travel. The second ring 20 (also commonly called a scraper or second compression ring) is located in the second groove 21; the second groove 21 is located 4-5 millimeters below the top groove 13. The piston outer surface between the top ring 11 and the second ring 20 is referred to as the second land or middle land 22 (in the case of gasoline or spark ignition engines the ring pack usually consists of three rings, or four or more rings for diesel engines). The face 23 of the second ring face can be a tapered wedge profile, slightly rounded at the lower edge; this rounding facilitates scraping off the oil layer during the piston downward travel without incurring excessive friction losses. It also serves to scrape off the excessive oil to maintain a thin oil film. The ring-groove clearance is usually around 50 microns (0.002 inches). The third ring 24 is the oil control ring, designed to maintain an oil film on the bore surface while scraping off and returning any excess oil to the sump.

Sources of hydrocarbon emissions are unburned fuel and oil. Major portions of such hydrocarbon emissions result from combustion chamber crevice volume, adsorbed and desorbed fuel from the oil film and oil ingested into the combustion chamber. Crevice volume is defined as remote spaces of the combustion chamber which trap the gas mixture charge during the compression stroke and effectively isolate the trapped charge from flame and thereby combustion. This trapped charge is released into the combustion chamber during the expansion stroke and is expelled along with the combustion products. The largest single constituent of crevice volume is the piston assembly. More specifically, this includes the top and second ring clearance volumes 29,30, and the piston land-bore annuli volumes 25,26 generated by the top and second ring lands.

A significant part of blow-by results from the gas flow behind the rings through the ring-groove clearances. Blow-by is that portion of the gas mixture of the combustion chamber (mainly the charge during the compression stroke and the combustion products after ignition and during expansion strokes) that flow past the ring pack into the oil sump. Two adverse consequences of blow-by are (i) loss of engine power and fuel economy (normal blow-by is around 0.75-1% of the volume of the change), and (ii) the boiling of oil due to contamination with acidified oil and contamination from combustion products.

Due to the large ring-groove clearance (29,30), the rings are permitted axial ring twist as shown in FIG. 3. The twisting action also eventually wears away the corners (such as 27,28 of groove 13) during piston strokes. The twisting or ring flutter generates a pounding action and causes wear at the groove edges 27,28. This enhances peristolic pumping action and increases oil consumption, hydrocarbon emissions and blow-by. During the expansion stroke, the combustion gases can fill the crevice volume behind the rings 11,20 and during the compression stroke, can escape by being pumped past the rings into the crankcase. Conversely, the oil can migrate behind the rings in the groove during the exhaust stroke and be pumped upwards into the combustion chamber.

Figure 7:
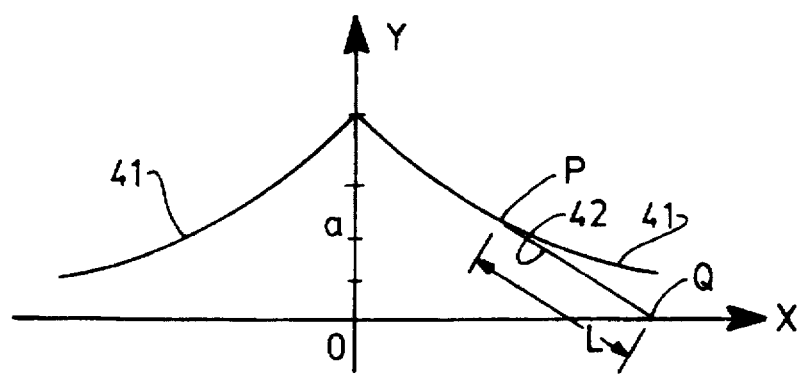
FIG. 7 is a graphical illustration of the mathematical definition of the curvature of the surfaces used in this invention.

As shown in FIGS. 4-5, for each seal element 34 this invention provides a piston assembly 36 that has, for each groove 31, radially outer regions 32,33 and for each seal element 34 has radially outer surface portions 35,37 of the side walls 39,40, all contoured with substantially tractrix surfaces. As shown in FIG. 7, the tractrix mathematical relationship is one where a curve 41 is described by the locus of one end P of a tangent line 42 (of length L) as the other end Q is moved along the X axis. As the X coordinate exceeds the length of the tangent line, the curve becomes asymptotic to the X axis. In the case of the two interengaging surfaces (such as 32,35 or 37,33) the resulting load point A therebetween is free to shift wile maintaining (along the entire length of travel of the load point) a constant applied or transferred load. As shown in FIG. 5, the crown surface 43 of the seal element may also have essentially mirror image tractrix surfaces 43a,43b, one in the upper half and one in the lower half of the crown surface. Each tractrix surface can rotate or translate and still maintain contact with the other tractrix surface. To find the X and Y coordinates of a point along such tractrix surfaces, the following equation is used:

$$X = L \cosh^{-1}(L/y) - \sqrt{L^2 - y^2}$$

The length of the tangent line is multiplied by the inverse hyperbole of the cosine of the length over Y less the square root of length squared minus y squared. To contour the shoulder surface 32 or 33 of the grooves, an assumption is made for X as an end point of the surface. For example, the lower point is assumed to have a Y coordinate of 0 and the X coordinate then is determined to be the intercept. The choice of intercept of the tractrix curve with the Y axis is of some design importance. The greater the depth 50 of the groove, the greater the Y intercept should be to accommodate a longer arc or region to define the groove shoulder. The height 51 of the groove influences the choice of Y intercept for the shoulders 43a and 43b of the element crown 43. It is desirable to merge or integrate the shoulders 43a,43b with no straight or connecting surface therebetween.

Figure 9:
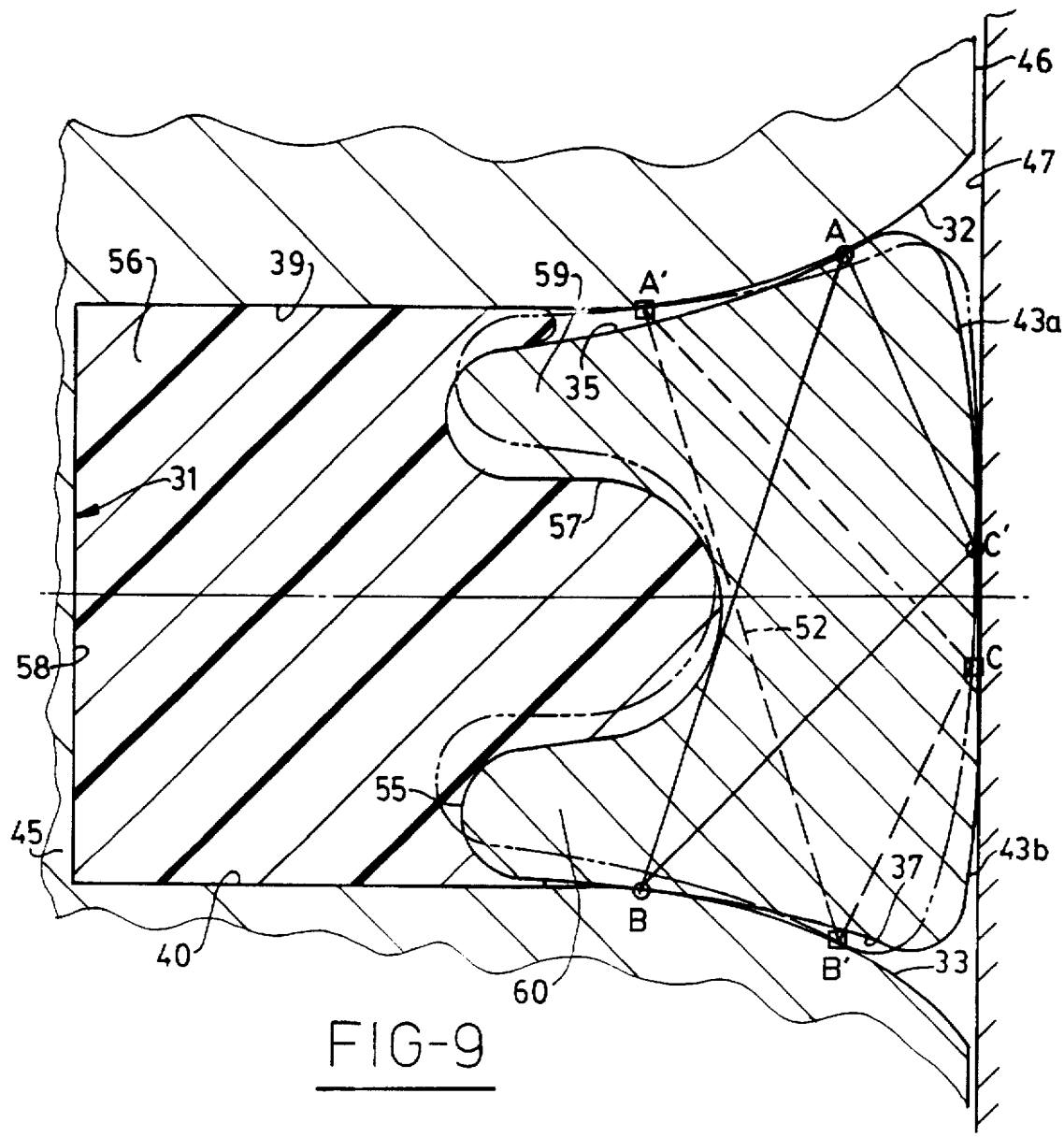
FIG. 9 is a still further greatly enlarged view of the seal element assembly illustrating positional change while retaining sealing effectiveness.

As shown in FIG. 9, the reaction contact points A and B of the groove shoulders with the element side surfaces 35,37 form a triangle 52 with the load contact point C of the crown 43 on the film of the bore wall 47. As the sealing element articulates in the groove from a position shown in full line to that shown in broken line, the triangle will shift (see broken line triangle) and contacts will move to A', B' and C'. The load contact point will consistently stay at the bore wall allowing at most only about 0.0002 inches spacing between the sealing element and bore wall. This permits a squeeze film of fluid (gas or oil) to reside therebetween enhancing the friction reduced sliding contact with the bore wall without allowing blow-by.

The sealing assembly of this invention has a piston 45 with a side wall 46 moveable closely along a bore wall 47 with a controlled squeeze film gap 48 therebetween. As shown in FIGS. 5 and 5A, the assembly defines surfaces in at least one of the bore wall 47 or piston 45 to form a groove 31 facing the other of the piston or bore wall, the groove having its outer radial regions 32,33 of the surfaces smoothly curved to form a pair of oppositely facing shoulders. The assembly further has a sealing element 34 with (i) smoothly curved side surfaces 35,37 mateable with the groove shoulders for supporting the element in the groove and (ii) a curved crown surface effective to tangentially contact the cylinder bore wall 47 while the side surfaces 35,37 each tangentially contact their respective mating groove shoulders 32,33. The pair of mating groove shoulders 32,33 and element side walls 35,37 each have defined curvatures as indicated above that are effective to maintain tangency and transfer any load in the element, resulting from the crown-cylinder bore wall contact, to the shoulders in a substantially equal manner regardless of articulation of the element with respect to the groove. The load at the contact points is virtually the same throughout because of the tractrix relationship and behavior. When the piston forces the element against the bore wall, reaction forces are transmitted through the element equally to each of the groove shoulders. If wear occurs at such shoulders, it will be uniform and even, preserving the tractrix configuration.

As shown in FIGS. 6 and 9, the seal assembly may further incorporate a hollowing of the sealing element 34 at its base or root 55 and insertion of an elastomeric ring 56 into the hollow cavity 57 to exert a resilient pressure between the root 58 of the groove 31 and the walls of cavity 57. The elastomeric ring (that fills the hollow ring and groove space) should have a resilient compressibility of about 20% when installed; the elastomeric material should be stable up to a temperature of 300° F. or higher. To prevent the material from rising above such temperature, means for splashing oil or other heat removing medium on the interior of the piston (proximate to the groove for the sealing element). The elastomeric ring will assist the inherent element tension to maintain contact (within 0.0002 inches) with the bore wall even under extreme low or high temperature conditions. The hollowness of the ring promotes or defines thin flexible element flanges 59,60 which, as urged by the memory of the elastomeric material, flex the flanges to maintain contact with the shoulders 32,33 (an axial deflection vector).

Figure 8:
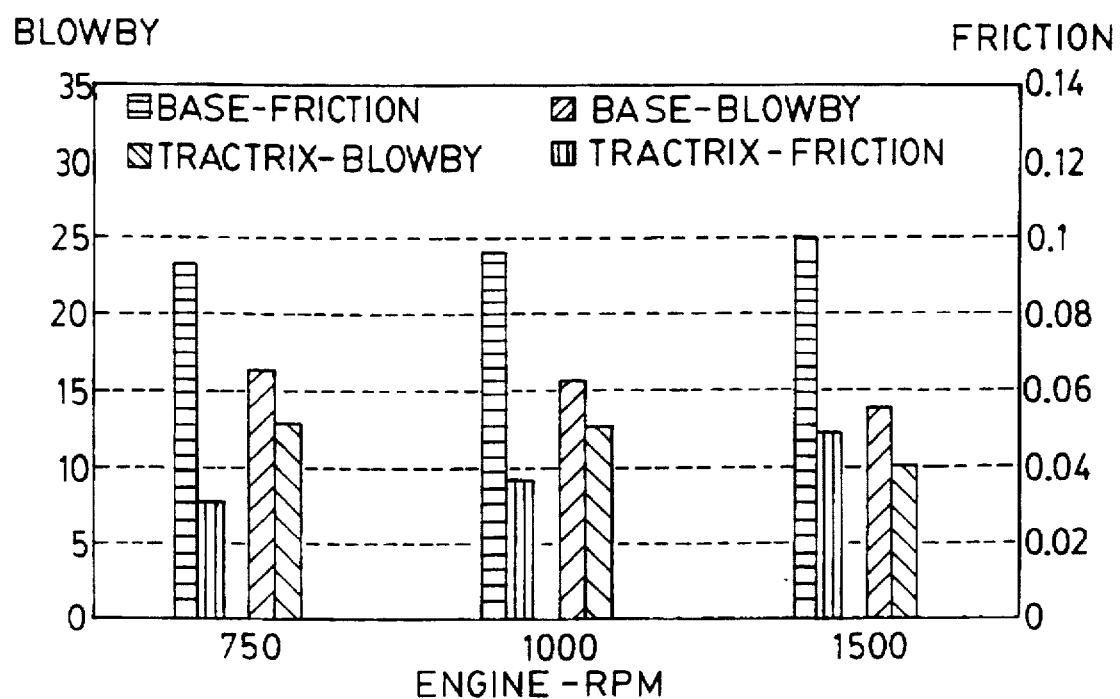
FIG. 8 is a bar graph comparing the friction and blow-by test data of this invention with that of a typical conventional commercial piston.

Advantageously, the piston, tractrix sealing element and bore wall are fabricated of a similar lightweight metal, such as aluminum. Thermal growth of each of such components will thus be essentially the same thereby enhancing the ability of the sealing element to maintain a friction reducing squeeze film along the bore wall. The sealing element is desirably an extruded aluminum alloy having a solid film lubricant coating impregnated into a prepared dimpled surface of such element. Extrudability facilitates making a hollow ring to receive the precompressed elastomer therein. Alternatively, the ring could be a soft steel that is continuously formed with a hollow shape by bellows expansion techniques where a charge is progressively exploded to form the metal strip to a continuous die. FIG. 8 shows the friction and blow-by using a conventional piston ring (commercially used in Ford Motor Company 1.9L-CUH engines) as the base, at different engine speeds. In comparison, FIG. 8 shows the friction and blow-by results of a piston assembly using the tractrix surfaces of this invention at various engine speeds for the same type of piston assembly. The comparison demonstrates friction is reduced from about 0.14 to 0.03–0.045 and blow-by is reduced from 14–17 cubic centimeters to about 10–13 cubic centimeters.

We claim:

1. A sealing assembly using a cylinder bore wall having a piston moveable closely along such wall with a controlled gap therebetween, the assembly comprising:

(a) walls, in at least one of said cylinder bore wall and piston, defining a groove facing the other of said cylinder bore wall and piston, the outer radial regions of said groove being smoothly curved to form a pair of oppositely facing shoulders;

(b) a sealing element positioned in said groove and having (i) smoothly curved side surfaces concurrently mateable with both said groove shoulders for supporting said element in said groove and (ii) a curved crown surface effective to tangentially contact said cylinder bore wall while said element side surfaces each tangentially contact their respective mating groove shoulders, said pair of mating groove shoulders and element side surfaces each having defined curvatures effective to maintain tangency and transfer any load, imposed on the element resulting from the crown contact, to both shoulders in a substantially equal manner regardless of articulation of the element in said groove.

2. The assembly as in claim 1 in which said defined curvatures are described, in X-Y coordinates, by one end point of a tangent line to the curvature as the other end of the tangent line is moved along the X axis.

3. The assembly as in claim 1, in which the curvature of said shoulders and element side surfaces adheres to a tractrix relationship whereby the tangential contact of a mating groove shoulder and element sidewall is free to shift along said define curvature as the element articulates.

4. The assembly as in claim 1, in which each of said shoulders and element side surfaces are coated with a thin film of solid lubricant in a polymer carrier.

5. The assembly as in claim 1, in which the crown of said seal element is spaced no greater than 0.0002 inches from said cylinder bore wall during reciprocation permitting a gap squeeze film to exist therebetween during compression or expansion strokes of the piston.

6. The assembly as in claim 1, in which said piston and seal element are each comprised of an aluminum based material.

7. The assembly as in claim 1, which further comprises means to bias the sealing element into tangential contact with the cylinder bore wall.

8. The assembly as in claim 7, in which said means comprises a hollow cavity in said sealing element defining flexible side legs in the sealing element effective to flex in a lateral direction relative to the cylinder bore wall.

9. A sealing assembly using a cylinder bore wall having a piston moveable closely along such wall with a controlled gap therebetween, the assembly comprising:

(a) walls, in at least one of said cylinder bore wall and piston, defining a groove facing the other of said cylinder bore wall and piston, the outer radial regions of said groove being smoothly curved to form a pair of oppositely facing shoulders;

(b) a sealing element positioned in said groove and having (i) smoothly curved side surfaces concurrently mateable with both said groove shoulders for supporting said element in said groove and (ii) a curved crown surface effective to tangentially contact said cylinder bore wall while said element side surfaces each tangentially contact their respective mating groove shoulders, the seal element being capable of articulating within said groove while maintaining contact not only with said cylinder bore wall but also with each of said shoulders;

said pair of mating groove shoulders and element side surfaces each having defined curvatures effective to maintain tangency and transfer any load, imposed on the element resulting from the crown contact, to both shoulders in a substantially equal manner regardless of articulation of the element in said groove.

10. The assembly as in claim 9, in which said seal element is an annular ring and said groove is an annular groove.

11. The assembly as in claim 9, in which said assembly has at least three of said rings and said grooves.

12. The assembly as in claim 11, in which said solid film lubricant is selected from the group consisting of boron nitride, graphite and molybdenum disulphide.

13. A sealing assembly using a cylinder bore wall having a piston moveable closely along such wall with a controlled gap therebetween, the assembly comprising:

(a) walls, in at least one of said cylinder bore wall and piston, defining a groove facing the other of said cylinder bore wall and piston, the outer radial regions of said groove being smoothly curved to form a pair of oppositely facing shoulders;

(b) a sealing element positioned in said groove and having (i) smoothly curved side surfaces concurrently mateable with both said groove shoulders for supporting said element in said groove and (ii) a curved crown surface effective to tangentially contact said cylinder bore wall while said element side surfaces each tangentially contact their respective mating groove shoulders, said pair of mating groove shoulders and element side surfaces each having defined curvatures effective to maintain tangency and transfer any load, imposed on the element resulting from the crown contact, to both shoulders in a substantially equal manner regardless of articulation of the element in said groove, and an elastomer ring acting between the root of the groove and the sealing element to bias the sealing element into tangential contact with the cylinder bore wall.

* * * * *